Figure 1:
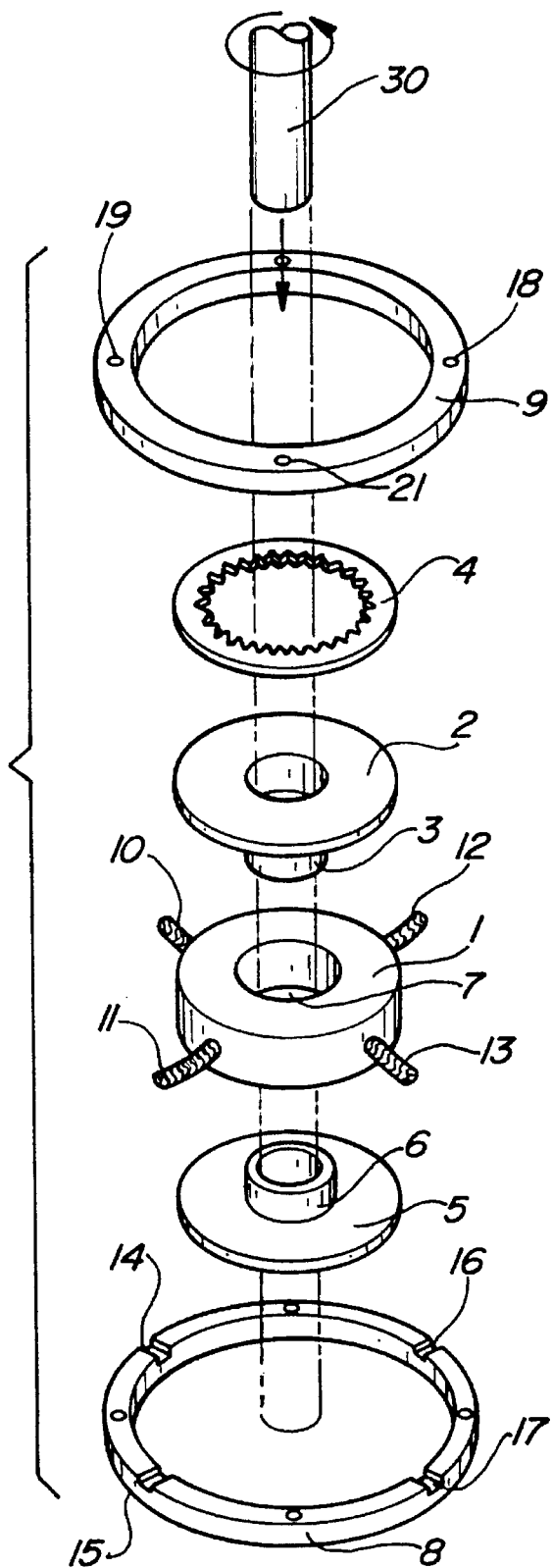

United States Patent [19]

Girardin

[11] Patent Number: 5,561,336
[45] Date of Patent: Oct. 1, 1996

[54] DEVICE FOR SUPPLYING ELECTRIC CURRENT TO A ROTATING PART AND ITS APPLICATION IN EDM

[75] Inventor: Roger Girardin, Vernior, Switzerland

[73] Assignee: Charmilles Technologies, S.A., Meyrin, Switzerland

[21] Appl. No.: 304,798

[22] Filed: Sep. 12, 1994

[30] Foreign Application Priority Data

Sep. 10, 1993 [CH] Switzerland ........................ 02714/93

[51] Int. Cl.⁶ .................................................. H02K 13/00
[52] U.S. Cl. ............................................. 310/232; 310/237
[58] Field of Search .................................. 310/219, 231, 310/232, 237, 238, 239, 248, 249

[56] References Cited

U.S. PATENT DOCUMENTS

| | | | |
|---|---|---|---|
| 2,774,898 | 12/1956 | Tourneau | 310/232 |
| 2,818,490 | 12/1957 | Dixon et al. | 219/69 |
| 3,022,479 | 2/1962 | Rohrbach | 310/248 X |
| 3,047,827 | 7/1962 | Stoddard | 339/5 |
| 3,314,038 | 4/1967 | Rutten | 310/232 X |
| 4,596,066 | 6/1986 | Inoue | 29/568 |
| 5,124,608 | 6/1992 | Lawrence et al. | 310/232 |
| 5,144,183 | 9/1992 | Farrenkopf | 310/237 X |
| 5,155,405 | 10/1992 | D'Aniello et al. | 310/237 |
| 5,287,032 | 2/1994 | Zolda | 310/219 |
| 5,345,132 | 9/1994 | Sasaki et al. | 310/239 |

FOREIGN PATENT DOCUMENTS

| | | |
|---|---|---|
| 1118875 | 12/1956 | France . |
| 2577156 | 8/1986 | France . |
| WO9011159 | 4/1990 | WIPO . |

*Primary Examiner*—Mark O. Budd
*Attorney, Agent, or Firm*—Gifford, Krass, Groh, Sprinkle, Patmore, Anderson & Citkowski, P.C.

[57] ABSTRACT

A good electric contact device is provided for carrying electrical current to a rotating cylindrical part; it comprises at least one conducting plate mounted around the rotating cylinder to be supplied with current, rotating together with it, while establishing a gold, almost frictionless, electrical contact, at least one electrical contact which is stationary during the rotation of the cylinder and provided with at least one housing in which means are set which are supplied with electricity from a generator, said contact having at least one side intended to be applied against one of the sides of the conducting guide so as to transmit to it very efficiently, almost without friction and overheating, the electrical current,and means to apply the stationary contact against the rotating guide.

These contacts are advantageously used for feeding the electroerosive current to a rotating spindle in an E D Milling machining.

13 Claims, 4 Drawing Sheets

DEVICE FOR SUPPLYING ELECTRIC CURRENT TO A ROTATING PART AND ITS APPLICATION IN EDM

The present invention concerns a device to supply electric current to a rotating cylindric metallic part by at least one not rotating, current-carrying conductor; in more general terms, it concerns also a device to establish any type of electric connection, such as the transmission of signals between a rotating part and a fixed conductor. Devices of this kind may, for example, be used with electric machining to supply a rotating electrode tool with electroerosion pulses; they can also be used in other fields to link various sensors or thermocouples mounted, for example, on the rotating part of a turbine or a generator, to stationary metering instruments.

Such a device must ensure reliable and constant conduction of electrical signals over long periods of time; the efficiency, that is to say the electric contact, must be as good as possible; it must moreover take place at low friction and preferably by avoiding any heating up. When it is intended to be used for electric machining, in particular EDM milling, the device must transmit at the least possible loss and heating up, a current of a very high density (e.g. several hundreds of amperes per cm 3) to an electrode tool rotating at a very high speed (several thousand rpm). The well-known friction brushes are no longer satisfactory, even when several radial brushes are used that are symmetrically arranged around the axis of revolution of the cylindrical part. It is practically impossible to adjust the concave profile of these brushes so that they will have the same bending radius as the rotating cylinder they have to supply with current; the contact is established either at the rims of the brushes (when the concavity of the profile is greater than that of the cylinder) or by a central area (when the concavity of the profile is smaller than that of the cylinder); but it is never established across the entire surface of the brush; the contact surface is therefore weak; hot spots appear; and as the brushes wear on the rims and in the center, they become deformed and thus wear rapidly and unevenly however carefully the surface surrounding the rotating part has been shaped. Contact resistance increases rapidly, which causes heating. Moreover, as soon as the rotating speed exceeds a few hundred rpm, the brushes tend to lose contact due to the fact that a film of air will form around the cylinder.

Mercury contacts are also known, for example those described in patents FR 1,118.875 and U.S. Pat. No. 3,022,479; a chamber filled with mercury is delimited by a hollow, electricity conducting and not rotating ring-shaped part which is mounted coaxially to the rotating cylinder; it has at each end a fixture acting as a seal to retain the mercury and contains a roller bearing connecting it with the rotating cylinder. The mercury establishes a good electrical contact with the rotating cylinder, which rotates while it "bathes" in this liquid. Due to the high rotating speed of the cylinder however, the annular seals risk getting worn which in turn engenders mercury leakage problems. This type of seal is therefore not appropriate for the objective of this invention: namely, to transmit high intensity current to a rotating element to which a high speed of rotation has been imparted.

Lastly, there exist also other solutions at the present state of the art, for example U.S. 2,818,490 or FR 2.577.156., describing contacts where the current must pass across roller bearings that establish the connection between fixed and rotating parts. But people skilled in the art know perfectly well, that roller bearings are not good electrical contacts. In view of the high speed of rotation and the high current density that have to be transmitted, one can foretell that poor contacts will rapidly occur, in other words strong heating and accelerated deterioration of these bearings, that is of the contacts, will ensue. Moreover, microdischarges will occur at a certain speed of rotation. Even without this problem of poor contact, a roller bearing has a small contact surface, that is to say poor efficiency. This type of solution is not appropriate for this invention either. Moreover, in FR 2.577.156 the current is no longer being supplied directly and radially through a fixed conductor to the rotating cylinder as is the case with friction brushes or with mercury as above or through roller bearings according to U.S. Pat. No. 2,818,490; the current passes firstly from the fixed conductor to annular conductor guides which are made to rotate together with the cylinder; the current follows through a path that is parallel to the axis of rotation of the cylinder, it subsequently passes from these guides onto the cylinders.

The objective of this invention was to create a good electric contact between a cylinder rotating at a very high speed, namely, several thousand rpm and a fixed conducting part, and to durably pass on from this part an electric current to the cylinder that could attain several hundred amperes per cm3 without any loss while heating up very little.

This objective has been attained through the device which establishes the electric contact in this present invention as defined under in the appended claim.

The device presents a fixed, not rotating conducting part, generally ring-shaped, surrounding the rotating cylinder to be supplied with current; it is provided with at least one housing, placed for example along some of its radii, into which are set organs that are supplied with current by a generator and are capable of supplying high current densities such as those supplied by multicoil or multiwire conducting braids or cables. We shall subsequently call it "contact" At least one of its sides is intended to be applied against one of the sides of a rotating electrical conducting guide, so as to establish an electrical contact that is practically exempt of friction; the latter is in general ring-shaped and we shall subsequently call it "plate"; it surrounds the rotating cylinder to be supplied with current; it is arranged to transmit current to the cylinder while maintaining a good contact with it, almost without any friction, while it is being made to rotate together with the cylinder.

According to some variants of this invention, the contact between the plate(s) and the contact part is obtained thanks to at least one element acting as a spring, such as, for example, an elastic washer or an annular spring acting like a swivel. This element makes it possible to press by means of a compressing element,the stack comprising at least one plate, the "contact", the element acting as a spring and a stop piece forming an integral part of the rotating cylinder; this compressing element is mobile along the rotating cylinder and is fitted to be fixed onto the latter, like a ring-shaped screw, for example. The element acting as a spring can be located either between the mobile element and the plate or the contact, or between the stop and the plate or the contact.

The stop forming part of the cylinder may, for example, be a collar or a thrust ball bearing or a ceramic slide bearing. It could also be replaced by one of the plates, the latter being arranged so that they can be fixed firmly onto the cylinder, for example by being screwed onto it. A plate can thus play the role of the stop or that of the mobile compression element. This practically frictionless contact is obtained through compressing the stack just enough to establish a good contact between the "contact" and the plate, but without braking the rotation of the latter, in other words, that of the rotating cylinder.

In the case of numerous adaptations of this invention, two plates are threaded onto the rotating cylinder on either side of the "contact". According to other variants of this invention, these plates are prolonged by a central, hollow washer, which is made to fit into the space provided in the center of the "contact", while also fitting tightly around the rotating cylinder; the electrical contact with the rotating cylinder can in that manner be also established through the washers, thus augmenting the contact area. The washers may also not be mounted into the space provided in the center of the "contact", the plate being threaded in the other direction onto the cylinder, in the manner that its side carrying the washer is not the one that makes contact with the "contact".

Figure 3:
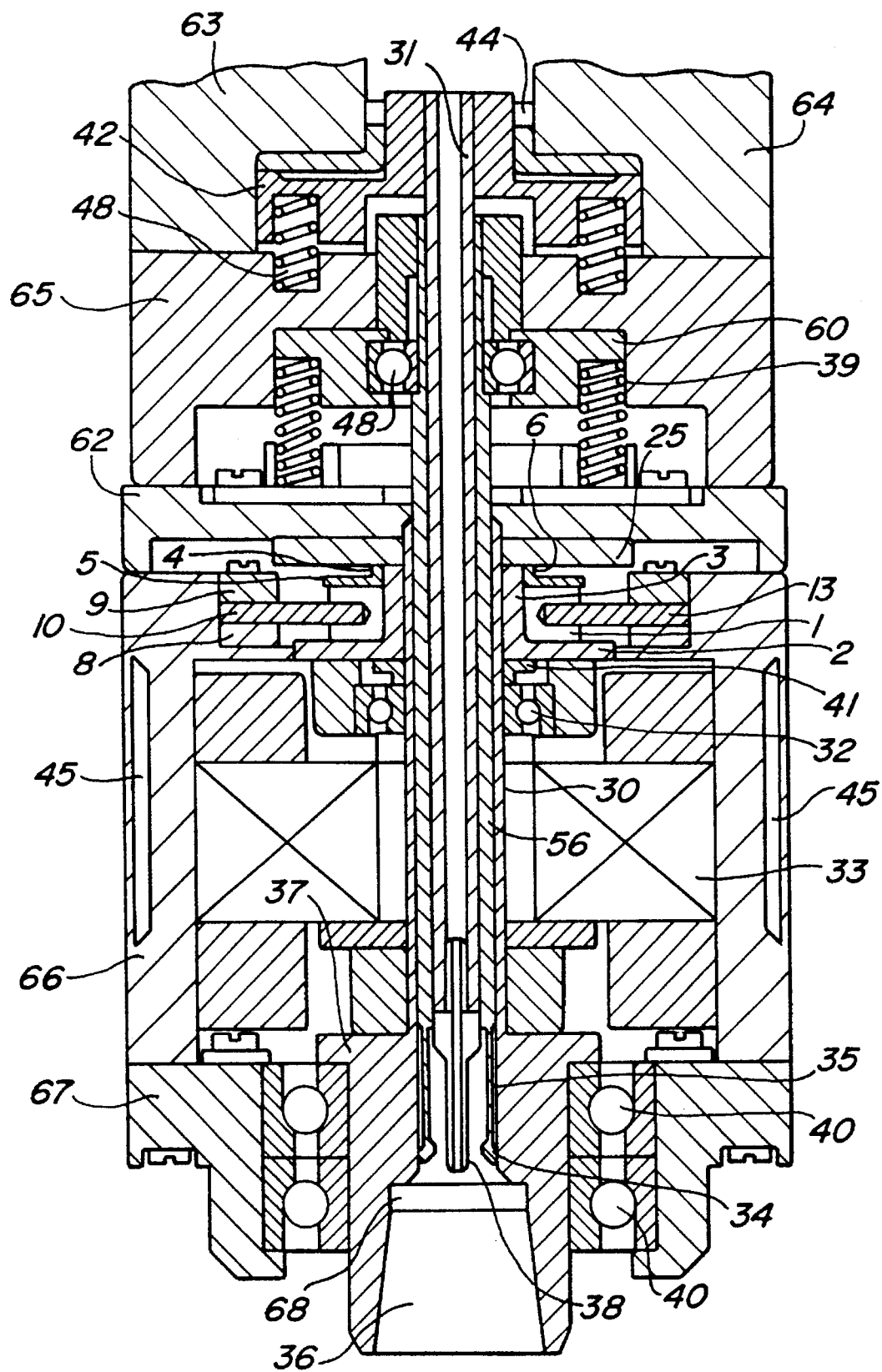

It can also be an advantage to have two plates provided on either side of the contact by orienting their washers in the same direction; these two plates may have a different geometry, one could, for example, be mounted to surround the other, as shown in FIG. 3. An insulating ring, of ceramic for example, can be mounted in the space provided in the center of the contact; it is of the same height and diameter as this space so as to insulate the "contact" from the rotating cylinder. Fixed parts may be provided, in particular a circular cradle acting jointly with a clasp intended to maintain the means supplying the current from the source of electricity.

The contact of this invention can therefore give rise to an infinity of structural variations. Two structural examples shall be illustrated diagrammatically in FIGS. 1 and 2 of the annexed drawing, a third example is shown in FIG. 3.

FIG. 1 represents a stack surrounding a rotating cylinder (30) that is to be supplied with current. It is made up of the ring-shaped spring (4), the first plate (2) with the washer (3), the ring-shaped contact (1) in which are set 4 multithread current supplying conductors (10 to 13), and a second plate (5) with the washer (6). To simplify the drawing, the mobile compressing element and the stop are not shown. Washers (3) and (6) are fashioned so as to fit into the recess (7) of contact (1). The multithread contacts (10 to 13) fit into the recess (14 to 17) of the cradle (8). The clasp (9) is fixed onto the cradle by means of 4 screws (18 to 21) (screw 20 is not shown), so as to act in conjunction with cradle (8) to hold the multithread conductors (10 to 13). Plates (2) and (5) are made to rotate together with cylinder (30), while the contact (1), the spring (4), the cradle (8) and the clasp (9) remain stationary during rotation.

Figure 2:
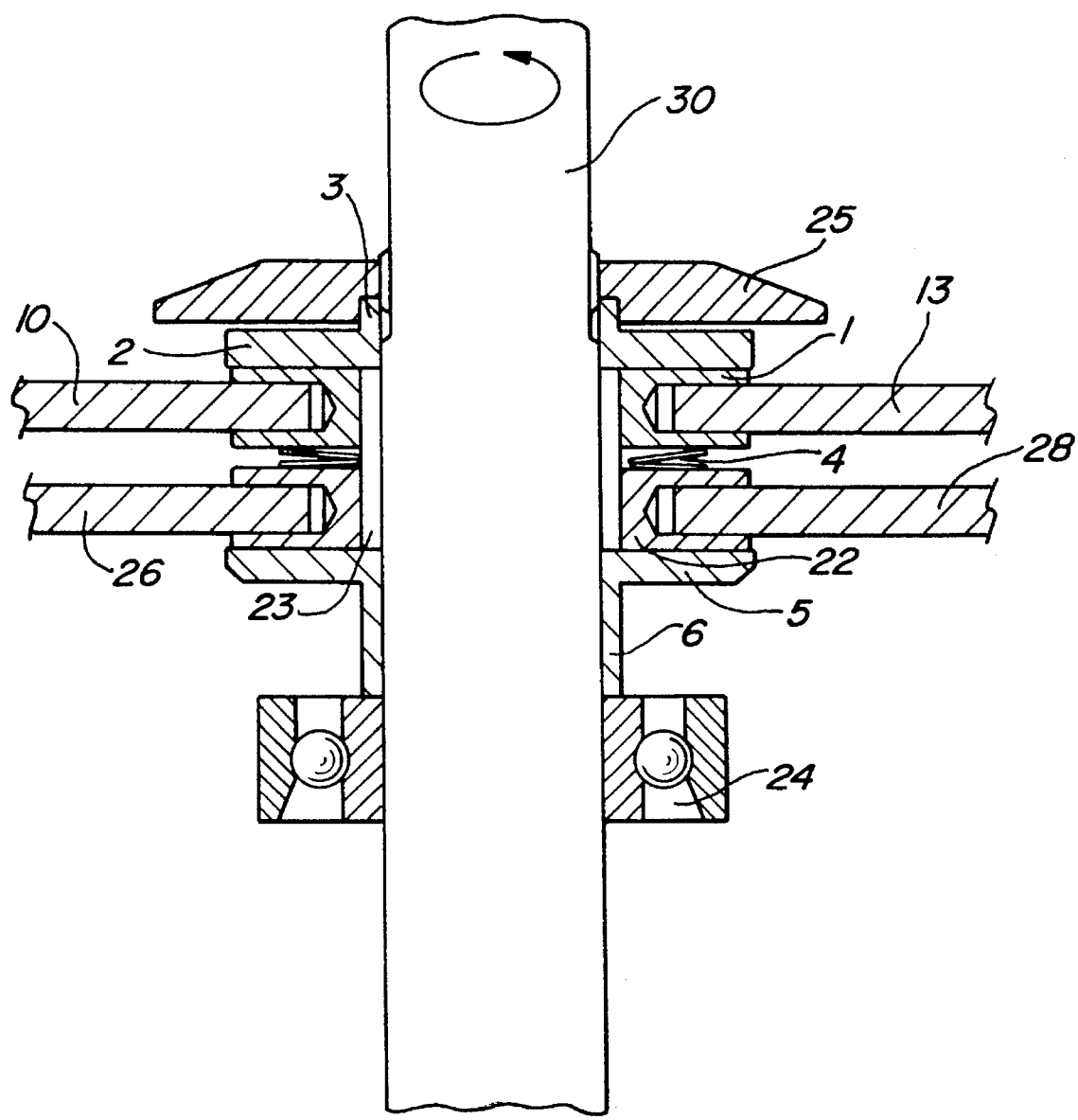

The elements of FIGS. 2 and 3 correspond to the elements shown in FIG. 1 and have the same reference numbers in the three figures. This FIG. 2 is an axial cross section of a variant of a contact according to this invention and shows 2 contacts (1) and (22) in which are set the multithread conductors (10) and (13), (26) and (28) respectively. The element (4) acting as a spring is mounted between these two contacts (1) and (22). Plates (2) and (5) respectively, are prolonged by the central, hollow washer (3), and (6) respectively; these washers (3) and (6) are located opposite the two contacts (1) and (22). Nut (25), which is mobile along the rotating cylinder (30), holds the washer (3) against the cylinder (30) and pushes back the stack constituted by the plate (2), the contacts (1) and (22) separated by spring (4), and the plate (8) prolonged by its washer (6), against the thrust ball bearing (24). An insulating ring (23) fits into the space provided in the center of contacts (1) and (22), in order to avoid unwanted contacts between these contact rings (1) and (22). The current is thus transmitted only from these rings (1) and (22) to the plates (2) and (5) and from the latter to the cylinder (30).

A set-up of the type illustrated in FIG. 3 can also be advantageously used: a first plate (2) is equipped with a washer (3) extending over the entire height of the contact (1) and of a second plate (5) with its washer (6); the diameter of this washer (6) is suitable to fit around washer (3) of the first plate (2); plate (5) is located on the other side of the contact (1) so as to press the spring element (4) tightly against the screw (25). Plate 2 moreover, is screwed on the rotating cylinder (30) and thereby acts as a stop. It does however rest on the guide 41, which is stationary during rotation and mounted adjacent to the roller bearings 32.

The contacts according to this invention thus make it possible to transmit, without much heat being created, a high density current to a cylinder rotating at high speed. They also provide many other advantages, in particular great structural simplicity and easy adjustment: it suffices to ensure proper tightening of the spring element holding the plate(s) against the contact(s). These contacts also can be very easily miniaturized. They permit to solve elegantly the problems created by brush contacts, for example in the case of EDM die sinking and contouring.

The progress they represent will become clearer through a description of one of their most advantageous applications, as defined in claims 8 to 14, i. e. their use in a rotating spindle for EDM milling, like for example the spindle illustrated diagrammatically in FIG. 3.

Let us recall that EDM milling consists in erouing a three-dimensional volume by means of a rotating electrode tool, of a simple shape, independent of the contour desired, by machining preferably at a high wear setting. A system for rotating the machining head at the speeds required for milling (several thousand rpm) is disclosed in the international application WO 90/11159. This system makes it possible to inject enough liquid through the body of the spindle into the tool holders to cool them down efficiently and also the tool; such cooling is necessary to counterbalance the considerable heat that is generated by the high density machining current (one or several hundred amperes/cm3) that is supplied; this known device, making it possible to attain rotations of 10000 rpm, comprised a rotating, ring-shaped seal, linking the spindle to a liquid source under pressure and intended to be leak-proof. To increase both the resistance and longevity of the seal which is rotating rapidly jointly with the spindle, it was necessary to use a feed duct as narrow as possible, for channelling the liquid inside the spindle, yet large enough to ensure a satisfactory flow of cooling liquid (for example, for a 100 mm spindle, the duct has a diameter of 6 mm).

Thanks to the contacts of this invention, the supply of high density machining current occurs with practically no heating up. It is no longer necessary to provide for an injection chamber inside the spindle for supplying an entire cooling network communicating with ducts in the tool holder. It suffices to inject the cooling liquid through the spindle, from the machining head to the tool holder and the tool.

Allow us to point out, that the structure illustrated in FIG. 3, represents two other improvements with respect to the spindle described in WO 90/111 59:

the motor actuating the spindle rotation is integrated in the body of the spindle, in particular thanks to the space gained through the suppression of the cooling network, due to the fact that the machining current is supplied with practically no heating up. This type of assembly diminishes the complexity and the cost of the device and improves the quality of the transmission and the overall equilibrium of the entire arrangement;

the spindle rotates around a hollow, stationary cylinder which canalizes the machining liquid injected through the spindle. Due to this, the problem of the tightness of a seal surrounding a spindle rotating at a high speed, has been eliminated.

The FIG. 3 shown, is an axial cross section of an assembly composed of a rotating spindle mounted into the spindle body connected by known means to a holding device (which is also known and not shown either in this figure); this holding device could, for instance, be a coupling apparatus to be assembled and removed from a chuck fixed by known methods to the mobile element of an EDM machining head, (which is also of a known type and not shown). The locking and releasing of the spindle can, for example, be actuated by applying hydraulic or pneumatic pressure. The sleeve of the spindle is hollow and surrounds a cylindrical chamber ending in a conical recess (36). It is composed of two concentric tubes (56) and (30) and made to rotate by the motor (33) around a non-rotating central tube (31). The internal tube (56) plays the role of a pull-piston: its inferior part (35) has vertical grooves, which thus form an elastic pincer; this part (35) ends in the shoulder (34) pulling the tool-holder upwards thereby maintaining it in the recess (36). To simplify the diagram, the tool holder and above organs are shown separately in FIG. 4.

The tube (56) slides along the tube (31) when it is actuated vertically by the pneumatically controlled piston (60). The return-action spring (39) pushes it subsequently upwards, into its resting position. The external tube (30) which ends in the collar (37) is not vertically mobile and has a cavity (68) (the function of which will be explained below with regard to FIG. 4).

The tube (31), which is stationary during the rotation of the spindle, extends to a chamber distributing the injection liquid and communicating with a feed duct that ends in the machining head. The leak-proof seal (44) that connects this tube (31) to the injection chamber no longer rotates, as with the spindle described in WO 90/111 59; it is stationary during the rotation of the spindle, thus eliminating the risk of wear.

Contrary to the above-mentioned known, high speeds rotating spindles, the spindle illustrated here does not contain any network with multiple ramifications that feeds a cooling liquid into its sleeve, nor a radiator with a large temperature exchanging surface in the body of the spindle. It presents simply the habitual ducts relating to motor (33).

The body of the spindle is constituted by the interface (63) which ensures, in particular, the supply of the electric current and of pneumatic or hydraulic fluid, and by elements (61), (62) and (64 to 66). At the lower end, there is the protecting part (61), shaped to require a minimum of space in the machining area, and fixed to element (66), which means that it is stationary during the rotation of the spindle, like all the other elements of the spindle body. These elements of the spindle body are housing in particular the electrical contact (element 66) according to this invention, as well as other organs; namely, a sensor for the rotating speed of the motor (33). The roller bearings (40) (in element (61)), (58) (in element (65)) and (32) (in element 66) are making all the parts (56), (30), (2 to 6), (25) and (41) inside the spindle body to rotate; the spindle being driven directly by motor (33); it can be connected to the numerical control of the machine and its speed of rotation slaved on the instantaneous variations of voltage Ui of each spark produced between the electrode tool and the workpiece being machined.

Lastly, the piston (42), which is an integral part of the tube (31), makes this tube (31) to move vertically. This tube (31), the duct (38) and the piston (42) which all are integral parts of this tube (31), as well as the piston (60), form a group of elements that do not rotate around the rotating axis of the spindle, but which can move vertically.

We shall also point out, that the internal tube (56) can also move vertically, pulling along the tool holder (not shown), though it does, of course, rotate. The mounting and removal of the tool holder can be carried out automatically (see FIGS. 3 and 4).

Figure 4:
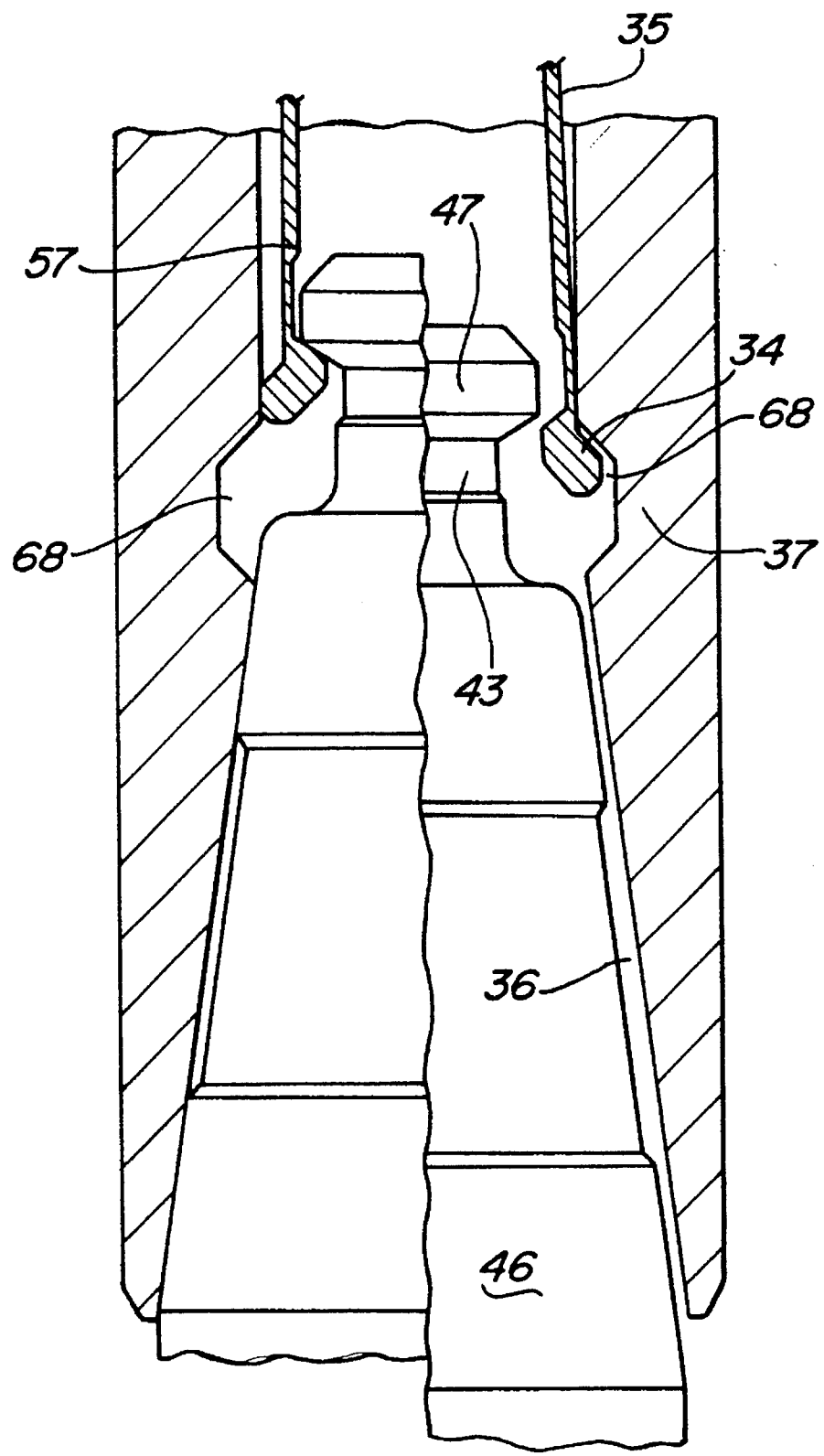

This FIG. 4 shows the upper end of a tool holder (46) in two positions:

the left side which corresponds to the tool holder (46) fixed in the spindle, the right side to the tool holder engaged in the recess (36), but not yet maintained by the pincers shaped end (35) of the inner tube (56). The reference numbers used are the same as those in FIG. 3. The elastic part forming pincers (35) that end up, as described above in the internal rotating tube (56) of the spindle, can be actuated upwards by spring (39), (FIG. 3) which pushes the piston (60) upwards and thus, thanks to the roller bearings (48), also the tube (56). The tool holder (46) contains a conical part (49) intended to engage in the bore (36). This cone (49) ends up in a projecting part (47) in the form of a rectangular spread, the dimensions of which, in the plane perpendicular to the axis of symmetry of the tool holder, are slightly smaller than the internal diameter of the pincer (35).The latter has a collar (57), which is shaped so as to:

retain this part (47) when it finds itself in the narrow or upper position, that is to say, when it is fully engaged above the collar (68) (left side of FIG. 4), to release part (47) when it is pushed downward and therefore is opening itself by engaging partly into the cavity (68), that is to say when the piston (60) is subjected to a thrust.

It suffices to inject a fluid (oil or compressed air; in this example pneumatic or hydraulic force is used but any other known means can also be used) exerting a pressure (duct not shown) to push the piston (60) downwards, making the tube (56) to descend and the pincers (35) to open at the level of the cavity (68); one subsequently lowers the device along the Z axis, which makes it possible for the projecting part (47) of the tool holder (46) to engage into the recess (36) and through and subsequently above the cavity (68). As soon as the injection is cut off, the piston (60) and the tube (56) and consequently the pincer (35) move upward, the latter tightening up around the recessing part (43) of the tool holder (46), making the latter to move also. To unlock the tool holder (46), the fluid is injected which causes the tube (56) to descend; its end (57) will push against the projecting part (47) of the tool holder (5), and its pincer (55) can be opened, thereby releasing the tool holder.

According to certain variants that are particularly advantageous with this application of this invention, the organs associated with the tool holder can act in conjunction with certain elements of the rotating spindle described above, in such as a way so as to lock and remove automatically various types of tools. Thus, the vertical mobility of the internal tube (31) prolonged by the duct (38) can make it possible to clasp or to release the electrode tool without having to remove the tool holder. It suffices, for example, to provide a tool holder fitted with a connecting tube acting in conjunction with this duct (38) and with a tie rod, the vertical movement of which will cause a pincer to tighten or loosen up around the electrode. By actuating the piston (42), which is an integral part of the tube (31), in the downward direction (in this example we are in the presence of a pneumatic force, any other mean could also be used) the duct (38) will push the connecting tube, which in turn will push the tie rod. The latter, by compressing for example a spring acting in conjunction with a clasp, will loosen up this clasp, enabling it to engage around the electrode or to release it. By cutting off the current supply to the piston (42), the latter will rise, being actuated by the spring (48), causing the tube (31) and the duct (38) to move upwards too. The spring that acts in conjunction with a clasp in the tool holder, pushes the tie rod upwards and enables the pincer to tighten, the case may be, around the electrode, and to pull it upwards.

I claim:

1. A device for establishing continuous electric contact between a cylindrical rotating part and at least one stationary conductor comprising:

at least one electrically conducting guide mounted around the rotating cylinder to be supplied with current, said at least one electrically conducting guide further including a first plate and a second plate which are mounted to the rotating cylinder in a spaced apart manner so as to be made to rotate together with the cylinder and to establish with it a good electrical contact which is almost frictionless, at least one electrical contact which is stationary during the rotation of the cylinder and said first and second plates, said at least one electrical contact including a ring-shaped body which is positioned around the cylinder between said first and second plates and in contact with said plates, a plurality of multi-threaded current supplying conductors projecting radially from said ring-shaped body and being received within a housing through which is supplied electricity from a generator, and at least one stationary spring member mounted around the rotating cylinder and applying a biasing force for assisting in maintaining an electrical contact between at least one of said plates and said ring-shaped body, wherein current flow is transmitted from said ring-shaped body, through said first and second plates and into the rotating cylindrical part.

2. The device according to claim 1, wherein said at least one conducting guide is shaped as a plate provided with a central through hole surrounding the rotating cylinder to be supplied with current, a ring portion projecting around said hole and fitted to nest around the rotating cylinder.

3. The device according to claim 1, wherein said at least ring-shaped one stationary contact is provided along at least one of its radii with said housing into which is set suitable means for carrying the electrical current supplied by the generator.

4. The device according to claim 1, wherein said electricity supplying means which are set into said stationary contact are fitted for transporting high current densities, in particular higher than one to several hundred amperes per $cm^3$, said electricity supplying means being selected from a set including multiwires, multicoil braids, and cable conductors.

5. The device according to claim 1, wherein said stationary spring member for holding said contact against said guide is selected from the group comprising an elastic washer and a ring-shaped and pivoting spring element so that a compressing element, which can move along the rotating cylinder to be supplied with current, is intended to be affixed to the cylinder.

6. The device according to claim 5, wherein said compressing element is said conducting guide.

7. The device according to claim 1, wherein said means for applying a biasing force further comprises an element integral with the rotating cylinder to be supplied with current, said element acting as a stop for said device comprising said conducting guide, said stationary contact and stationary spring member.

8. The device according to claim 1, the rotating part further comprising an electricity conducting rotating spindle wherein said spindle is made to rotate by a motor integrated into a spindle body and which is adjustable to select a rotating speed of said spindle according to a variation of a parameter measured during machining and where a machining current is supplied to said spindle with practically no overheating.

9. The device according to claim 8, wherein said spindle is made to rotate at over 700 rpm, preferably at a range extending upwardly of several thousand rpm, without overheating.

10. The device according to claim 1, the rotating part further comprising an electricity conducting rotating spindle wherein said spindle rotates around a hollow cylinder which feeds a machining liquid under pressure through said spindle, from a machining head to a tool holder and a tool, where a high density current is supplied almost without overheating, thus obviating the need to set up a cooling network within said spindle.

11. The device according to claim 10, where said hollow cylinder which feeds the machining liquid is stationary during the rotation of said spindle as well as a ring-shaped and leak-proof seal mounted around its end to link said spindle to the source of the liquid under pressure, a diameter of a tube within said spindle can be chosen without any limitation due to the leak-proofness of said ring-shaped seal to increase the resistance and the longevity of said seal by preventing it from becoming involved in rapid rotation.

12. The device with a spindle according to claim 10, where said hollow cylinder which feeds the machining liquid is fitted for sliding inside a coaxial duct of said spindle so as to act in conjunction with means provided in said tool holder to clasp or release the tool without any manual operation.

13. A device according to claim 1, further comprising an electricity conducting rotating spindle wherein said spindle is provided with two coaxial rotating tubes, an external tube having a bore intended to receive an end of said tool holder and an internal tube being fitted for sliding inside said external tube so as to act in conjunction with said holding means of the tool holder by exerting on said tool holder a force directed towards the bottom of the bore and appropriate to lock and unlock said tool holder without any manual operation.

* * * * *

UNITED STATES PATENT AND TRADEMARK OFFICE
CERTIFICATE OF CORRECTION

PATENT NO. : 5,561,336
DATED : October 1, 1996
INVENTOR(S) : Roger Girardin

It is certified that error appears in the above-indentified patent and that said Letters Patent is hereby corrected as shown below:

Column 1, line 47, "1,118.875" should be --1.118.875--.
Column 2, line 26, "claim" should be --claims--.
Column 2, line 34, after "contact" insert --.--.
Column 3, line 61, "(8)" should be --(5)--.
Column 4, line 27, "erouing" should be --eroding--.
Abstract, line 5, "gold" should be --good--.

Signed and Sealed this

Twenty-second Day of July, 1997

Attest:

BRUCE LEHMAN

Attesting Officer

Commissioner of Patents and Trademarks